US006994100B2

(12) United States Patent
Allen

(10) Patent No.: US 6,994,100 B2
(45) **Date of Patent: *Feb. 7, 2006**

(54) METERING VALVE

(76) Inventor: Thomas E. Allen, 9722 S. Oswego Ave., Tulsa, OK (US) 74137

(*) Notice: Subject to any disclaimer, the term of this patent is extended or adjusted under 35 U.S.C. 154(b) by 8 days.

This patent is subject to a terminal disclaimer.

(21) Appl. No.: 10/822,574

(22) Filed: Apr. 12, 2004

(65) Prior Publication Data

US 2004/0187926 A1 Sep. 30, 2004

Related U.S. Application Data

(63) Continuation-in-part of application No. 10/151,737, filed on May 20, 2002, now Pat. No. 6,789,565.

(51) Int. Cl.
*E03B 1/00* (2006.01)
*F16K 25/00* (2006.01)

(52) U.S. Cl. .......................... 137/1; 251/161; 251/162; 251/304

(58) Field of Classification Search ................ 251/161, 251/162, 304; 137/1
See application file for complete search history.

(56) References Cited

U.S. PATENT DOCUMENTS 3,276,466 A 10/1966 Herbert
3,353,785 A 11/1967 Eggers
3,910,554 A 10/1975 Speedie
5,310,162 A 5/1994 Baumann
5,355,951 A 10/1994 Allen et al.
5,571,281 A 11/1996 Allen
6,789,565 B2 * 9/2004 Allen ......................... 251/161

FOREIGN PATENT DOCUMENTS

JP 02-108842 A 4/1990

OTHER PUBLICATIONS

Clyde Spheri Valve, Clyde Pheumatic Conveying, PO Box 326, Milford Ohio.

* cited by examiner

*Primary Examiner*—A. Michael Chambers
(74) *Attorney, Agent, or Firm*—Molly D. McKay

(57) ABSTRACT

A metering valve for metering dry powder material such as cement. The interior of the valve housing is expanded outward beginning at the sealing surface or lip located adjacent to the inlet opening, thereby forming an enlarged gap between the valve sleeve and housing to discourage powder accumulation in the gap and interference of large bulk particles and foreign materials with the sleeve and housing. An eccentric intermediate sleeve aligns the valve sleeve relative to the housing prior to rotation of the valve sleeve by either moving the valve sleeve away from or toward the valve inlet. The valve sleeve has a rubberized layer to seal with the housing's sealing surface or lip. A sleeve shield blocks entry of powder into the mouths of the vacuum breakers to prevent plugging of the vacuum breakers. Ball bearings are employed to suspend the valve sleeve within the housing, making the valve sleeve easier to rotate.

4 Claims, 5 Drawing Sheets

METERING VALVE

CROSS-REFERENCE TO RELATED APPLICATIONS

The present invention is a continuation in part of U.S. patent application Ser. No. 10/151,737 for Metering Valve filed on May 20, 2002 now U.S. Pat. No. 6,789,565.

BACKGROUND OF THE INVENTION

1. Field of the Invention

The present invention relates to a valve for metering dry bulk powdered materials, such as for example cement. The primarily purpose of this valve is to proportionally meter bulk material for a blending or mixing operation. This design has an approximately linear characteristic wherein equal displacements of the valve sleeve will obtain approximately equal increases in valve opening area. This arrangement makes it well suited to automatic control of bulk materials.

Specifically, the present invention is an improved metering valve that addresses a variety of problems related to current metering valves, i.e. the problems of dry powdered material accumulating between the valve sleeve and the valve housing thus making the valve hard to turn, excessive wear on the valve caused by the abrasive action of the dry powdered material, incomplete sealing the valve when the valve is closed, and dry powdered material plugging off the vacuum breakers provided on the valve. In addition "dirty" cement may contain small rocks and other foreign material that may interfere with the normal operation of the valve. The foreign material may lodge in between the valve sleeve and body thus causing the valve not to turn or causing damage to the valve mating surfaces.

2. Description of the Related Art

Current metering valves employed to meter dry bulk powdered material, such as cement, present a variety of problems. First, current metering valves have a problem with dry powdered material accumulating between the valve sleeve and the valve housing. Because both the valve sleeve and the valve housing are circular in shape and the clearance between the valve sleeve and valve housing on current metering valves is uniform around the entire circumference of the valve sleeve, the dry powdered material tends to pack into the gap separating the valve sleeve and housing and forms a hardened layer between the two valve members. This hardened layer causes wear of the valve and can ultimately cause the valve sleeve to bind or freeze up within the housing. The valve must then be taken out of service and disassembled so that the hardened layer can be chipped off of the valve. Removing the valve from service for this type of maintenance is time consuming, labor intensive, and costly.

A second problem with current metering valves is that the leading edge of the sleeve opening provided in the valve sleeve is the point at which the greatest wear due to abrasion by the dry powdered material occurs. Excessive wear on the valve caused by the abrasive action of the dry powdered material allows more of the dry powdered material to enter the gap between the valve sleeve and the housing, thus acerbating the previously described problem of dry powdered material forming a hardened layer in the gap.

Also, with the leading edge of the sleeve opening worn by the abrasive action of the dry powdered material, the valve does not seal tightly when the valve is closed.

A final problem with current metering valves in that dry powdered material sometimes enters the mouths of the vacuum breakers provided in the valves and plugs off the openings to the vacuum breakers. If dry powder becomes plugged within the vacuum breakers, this may allow bulk material to be discharged externally, thus causing an environmental problem for the operator. He may not be able to see due to dust, and the dust is unhealthy to breathe. Current metering valves have the mouths of the vacuum breakers open to the housing of the valves, thus allowing dry powered material to fly into the mouths and come into contact with the moisture. The moistened powdered material will then set up and over time will completely plug the openings to the vacuum breakers, making the vacuum breakers inoperative.

The present invention addresses these problems by providing a metering valve with greater clearance between the valve sleeve and housing in the areas not adjacent to the metering edges of the housing. With greater clearance between the valve sleeve and housing except at the sealing surface or lip, the problem of creating an unwanted hardened layer or interference with foreign particles in the gap separating these valve elements is either eliminated or greatly improved.

The present invention also is provided with an eccentric intermediate sleeve that serves to align the valve sleeve relative to the housing. By rotating the intermediate sleeve slightly, this rotational motion of the intermediate sleeve translates into a back-and-forth motion of the valve sleeve, thus moving the valve sleeve either nearer or further from the front side of the valve body, i.e. the side of the valve body through which the dry powdered material enters the valve.

The ability to move the valve sleeve toward or away from the front side of the valve body independent of the rotational movement of the valve sleeve allows the valve sleeve to move away from the housing before it is rotated and then moved back toward the front side of the valve body once the valve sleeve has been rotated, thus forming a tight seal between the sleeve and sealing surface or lip located adjacent the inlet opening provided in the front side of the valve body for admitting dry powder material to the valve. A rubberized layer is added to the exterior surface of the valve sleeve to further enhance the seal between the valve sleeve and the housing. By moving the valve sleeve away from the housing employing the eccentric intermediate sleeve, the layer is disengaged from contact with the housing prior to the valve sleeve being rotated. Otherwise, the layer would be damaged when the valve was opened and closed.

In order to prevent dry powder material from blowing into the mouths of the vacuum breakers, a sleeve shield is provided in the present valve to cover the openings leading to the vacuum breakers. The sleeve shield is sealed to the housing of the valve upstream of the openings that lead to the vacuum breakers, and the sleeve shield extends downstream of the openings.

Finally, the present invention employs ball bearings to suspend the valve sleeve within the housing, thereby making the valve sleeve easier to rotate.

SUMMARY OF THE INVENTION

The present invention is a metering valve with greater clearance between the valve sleeve and the areas of the housing not adjacent to the metering edges of the housing. This is achieved by employing a housing that, when viewed in cross section, has an interior surface that is not perfectly circular, but is instead expanded outward slightly just adjacent to the inlet opening of the housing. This creates greater clearance between the valve sleeve and the housing except at the sealing surface or lip of the valve. With this greater clearance within the valve, the problem of creating an unwanted hardened layer in the gap separating these valve elements, i.e. the housing and the metering sleeve, is either eliminated or greatly improved.

The present invention also is provided with an eccentric intermediate sleeve that serves to align the valve sleeve relative to the housing. By rotating the intermediate sleeve slightly, this rotational motion of the intermediate sleeve translates into a back-and-forth motion of the valve sleeve, thus moving the valve sleeve either nearer or further from the front side of the valve body, i.e. the side of the valve body through which the dry powdered material enters the valve.

The ability to move the valve sleeve toward or away from the front side of the valve body independent of the rotational movement of the valve sleeve allows the valve sleeve to move away from the housing before it is rotated and then moved back toward the front side of the valve body once the valve sleeve has been rotated, thus forming a tight seal between the sleeve and the inlet opening provided in the front side of the valve body for admitting dry powder material to the valve. A rubberized layer is added to the exterior surface of the valve sleeve to further enhance the seal between the valve sleeve and the housing. By moving the valve sleeve away from the housing employing the eccentric intermediate sleeve, the layer is disengaged from contact with the housing prior to the valve sleeve being rotated. Otherwise, the layer would be damaged when the valve was opened and closed.

In order to prevent dry powder material from blowing into the mouths of the vacuum breakers, a sleeve shield is provided in the present valve to cover the openings leading to the vacuum breakers. The sleeve shield is sealed to the housing of the valve upstream of the openings that lead to the vacuum breakers, and the sleeve shield extends downstream of the openings.

Finally, the present invention employs ball bearings to suspend the valve sleeve within the housing, thereby making the valve sleeve easier to rotate.

DETAILED DESCRIPTION OF THE PREFERRED EMBODIMENT INVENTION

Figure 2:
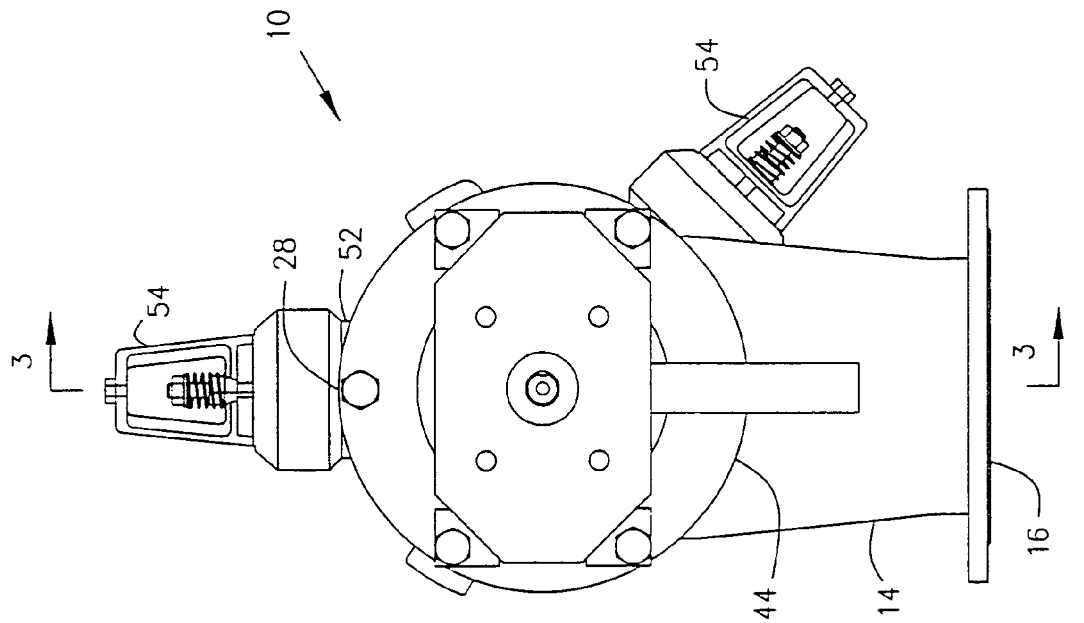
FIG. 2 is a top plan of the metering valve of FIG. 1.
Figure 1:
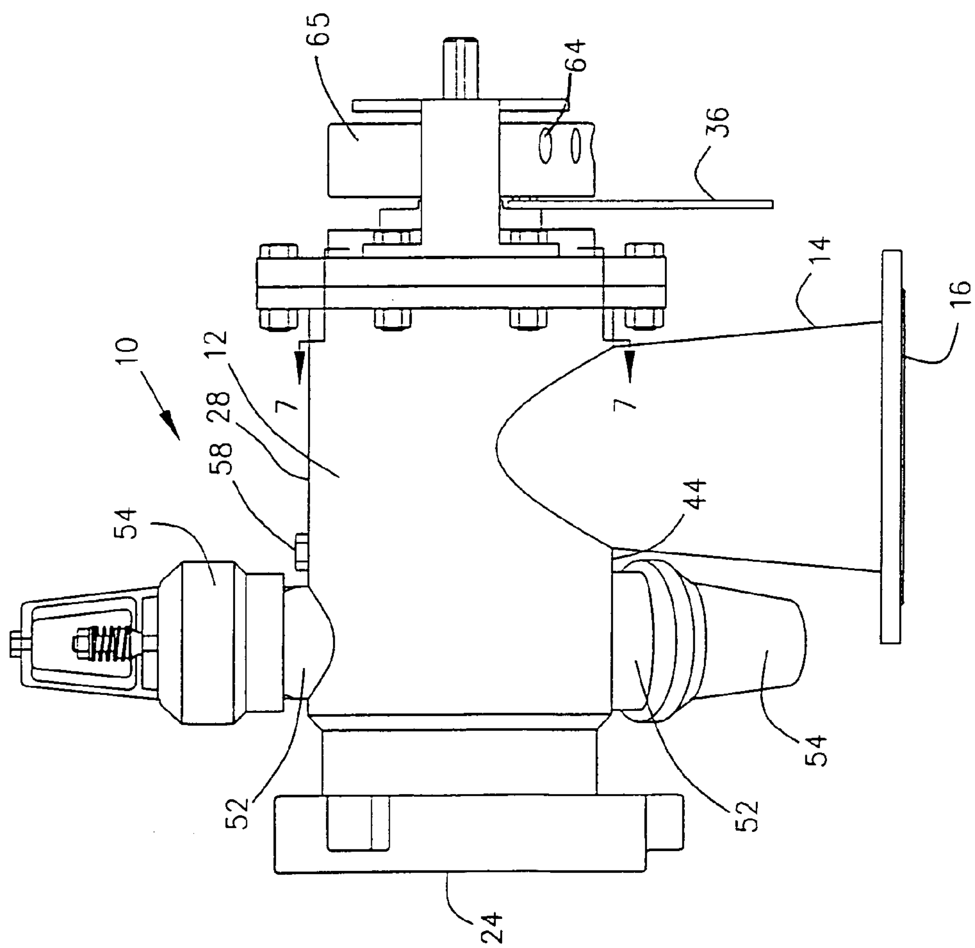
FIG. 1 is a side view of the exterior of a metering valve for use with dry powdered material constructed in accordance with a preferred embodiment of the present invention.
Figure 3:
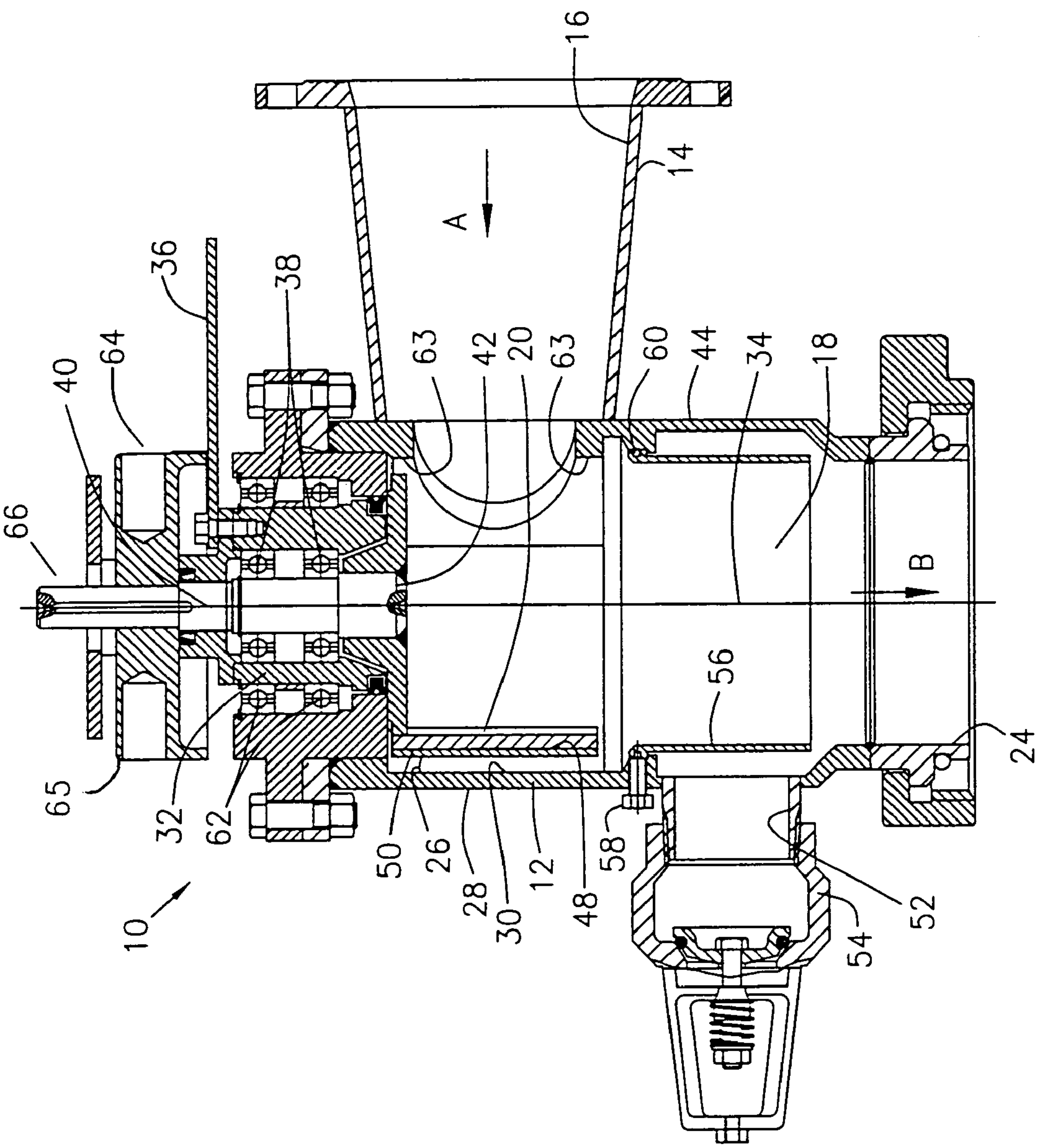
FIG. 3 is a cross sectional view taken along line 3—3 of FIG. 2.

Referring now to the drawings and initially to FIGS. 1–3, there is illustrated a metering valve 10 that is constructed in accordance with a preferred embodiment of the present invention. The valve 10 is provided with a housing 12 having an dry powder inlet 14 which communicates via an inlet opening 16 to the hollow interior 18 of the valve 10 and through which dry bulk powder material, indicated in FIG. 3 by arrow A, is admitted to the hollow interior 18 of the valve 10'.

Figure 5:
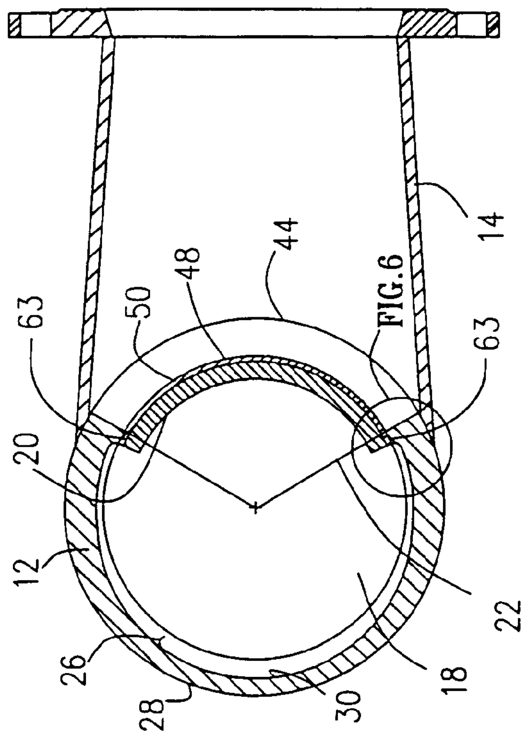
FIG. 5 is a cross sectional view of the housing taken along line 5—5 from FIG. 4 with the valve sleeve shown in a closed position relative to the housing.

A valve sleeve 20 is provided rotatably suspended within the housing 12 so that the valve sleeve 20 completely covers the inlet opening 16 then the valve sleeve is rotated to the closed position 22 and so that the valve sleeve 20 can be rotated to gradually open the valve 10. FIG. 5 illustrates the valve sleeve 20 in the closed position 22 and sealed position. Whenever the valve 10 is open, dry powder material passes through the hollow interior 18 of the valve 10 and exits the valve 10 via an outlet opening 24 provided in the housing 12, as shown in FIG. 3 by arrow B. The valve sleeve 20 is normally rotated via a hydraulic rotary actuator (not illustrated) that bolts onto a distal end 66 of the shaft 40. Alternately, the valve sleeve 20 can be manually rotated by employing a tool that removably inserts into openings 64 provided in a manual input wheel 65 that is secured to and rotates in conjunction with the shaft 40.

As shown in FIGS. 3 and 5, the housing 12 of the metering valve 10 is provided with greater clearance or a larger gap 26 between the valve sleeve 20 and the housing 12 on the back side 28 of the valve 10, i.e. the side of the valve 10 opposite the inlet opening 16, and everywhere within the housing except at the sealing surface or lip 63 provided on the front side 44 of the valve 10 adjacent the inlet opening 16. FIG. 5 shows in dashed lines the path of rotation of the valve sleeve 20 as the valve sleeve 20 is rotated within the housing 12. Immediately adjacent to the sealing surface or lip 63 in the housing 12, the internal surface 30 of the housing 12 begins to become larger, thus creating a significantly increased clearance or gap 26. This clearance or gap 26 gradually increases to a maximum at the opposite or back side 28 of the valve 10. This increasing gap 26 is achieved by employing a housing 12 that, when viewed in cross section, has an interior surface 30 that is not perfectly circular, but is instead expanded rapidly outward adjacent to the sealing surface or lip 63 and continues to expand outward slightly at the back side 28 of the housing 12. This creates greater clearance or a larger gap 26 between the valve sleeve 20 and the interior surface 30 of the housing 12 everywhere except at the sealing surface or lip 63. This greater clearance or larger gap 26 of the valve 10 tends to prevent the dry powder material from being compacted, thereby preventing or greatly slowing down the formation of an unwanted hardened layer in the gap 26. Also, this gap prevents large particles and foreign material from interfering with the housing 12 and valve sleeve 20.

The valve 10 is also provided with an eccentric intermediate sleeve 32 that serves to align the valve sleeve 20 relative to the housing 12. The intermediate sleeve 32 is located eccentric relative to a centerline 10 of the valve 10 and therefore eccentric relative to the interior surface 30 of the housing 12. The intermediate sleeve 32 is attached to a lever 36 for mechanically rotating the intermediate sleeve 32 relative to the housing 12. The intermediate sleeve 32 is provided with a first pair of ball bearing bushings 38 located between the sleeve shaft 40 and the intermediate sleeve 32 and in which the sleeve shaft 40 rotates. The intermediate sleeve 32 is also provided with a second pair of ball bearing bushings 62 located between the intermediate sleeve 32 and the housing 12 in which the intermediate sleeve 32 rotates. Ball bearings are preferably employed in bushings 38 and 62 because the ball bearings allow easier rotation of the sleeve shaft 40 and intermediate sleeve 32. The valve sleeve 20 is attached to one end 42 of the sleeve shaft 40. By rotating the intermediate sleeve 32, this rotational motion of the intermediate sleeve 32 translates into a back-and-forth motion of the valve sleeve 20, thus moving the valve sleeve 20 either nearer to or further from a front side 44 of the valve 10, i.e. the side of the valve 10 through which the dry powdered material enters the valve 10, depending on which way the intermediate sleeve 32 is rotated.

The ability to move the valve sleeve 20 toward or away from the front side 44 of the valve 10 independent of the rotational movement of the valve sleeve 20 allows the valve sleeve 20 to move away from the housing 12 at the front side 44 of the valve 10 before the valve sleeve 20 is rotated via the sleeve shaft 40 to open and close the valve 10, and allows the valve sleeve 20 to then move back toward the front side 44 of the valve 10 once the valve sleeve 20 has been rotated. By moving the valve sleeve 20 toward the housing 12 at the front side 44 of the valve 10, the valve sleeve 20 thus forms a tighter seal between the valve sleeve 20 and the inlet opening 16 than would otherwise be possible.

Figure 6:
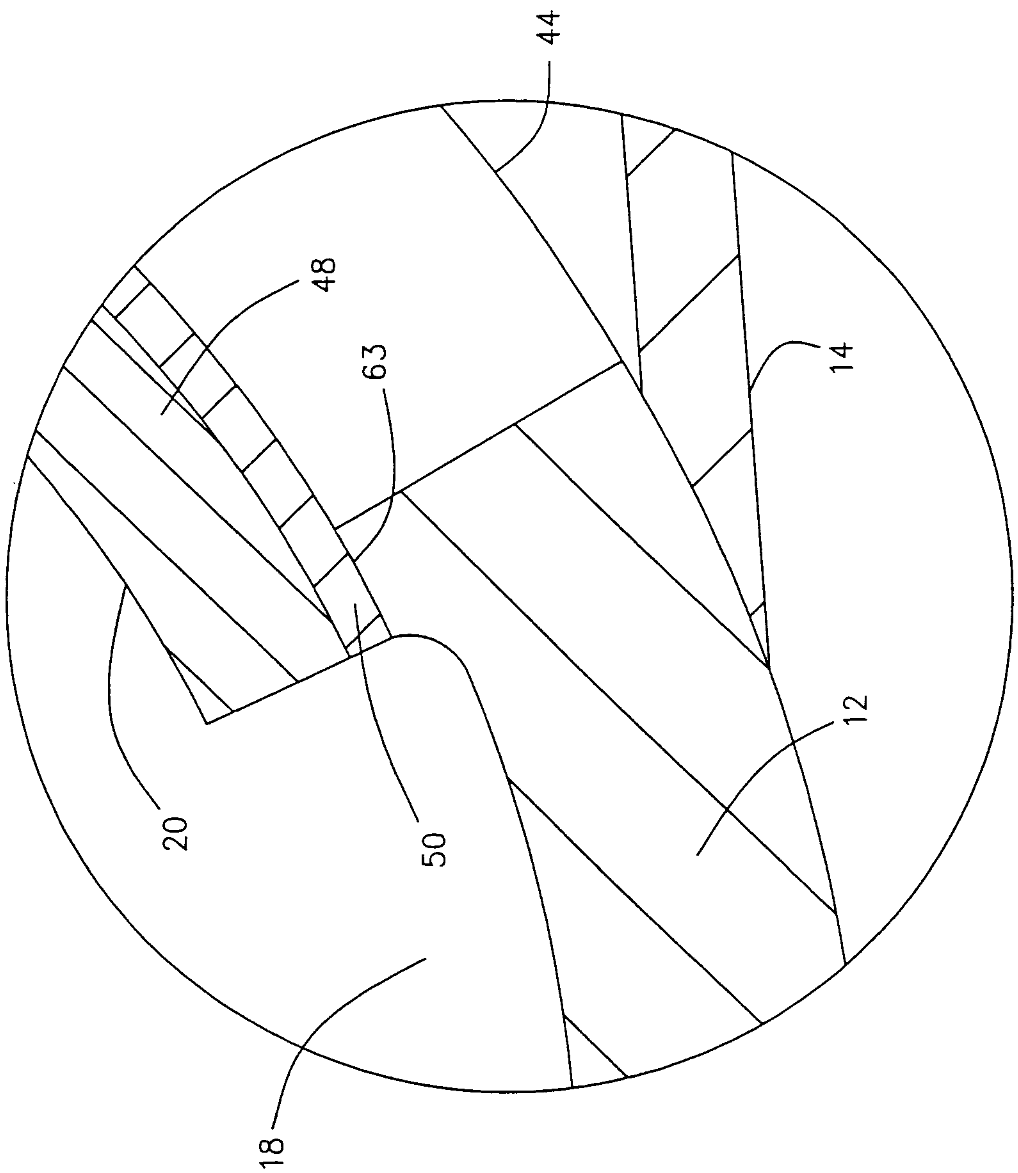
FIG. 6 is an enlarged view of the portion of FIG. 5 indicated by the circled labeled "FIG. 6".

Referring now to FIGS. 5 and 6, to further enhance the seal formed between the inlet opening 16 of the housing 12 and the valve sleeve 20, an exterior surface 48 of the valve sleeve 20 is coated with a rubberized layer 50. This rubberized layer 50 seats against a sealing surface in the form of a lip 63 provided on the interior surface 30 of the housing 12 so that the lip 63 encircles that portion of the housing 12 adjacent to and opening into the inlet opening 16.

Figure 7:
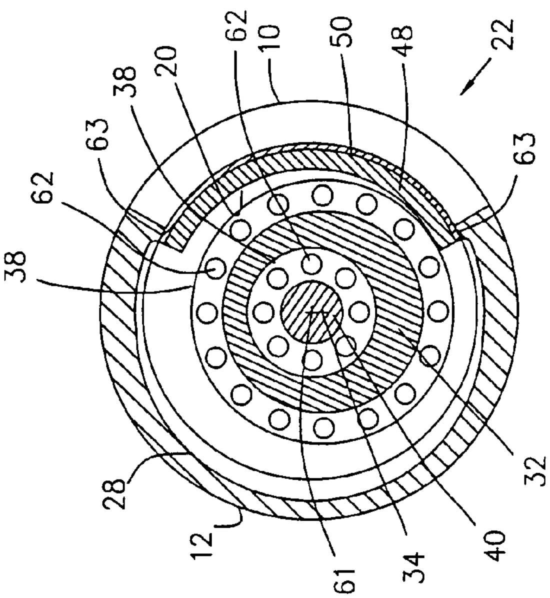
FIG. 7 is a cross sectional view of the valve taken along line 7—7 of FIG. 1 with the valve shown in a closed and sealed position.

FIG. 7 illustrates the relative position of the valve sleeve 20 to the housing 12, and more specifically the relative position of the rubberized layer 50 of the valve sleeve 20 to the lip 63 provided on the housing 12, when the valve 10 is closed and sealed. Numeral 61 represents the centerline for the eccentric intermediate sleeve 32. In this closed position 22, the rubberized layer 50 is tightly abutted against the lip 63, thereby preventing material from entering the hollow interior 10 of the valve 10.

Figure 8:
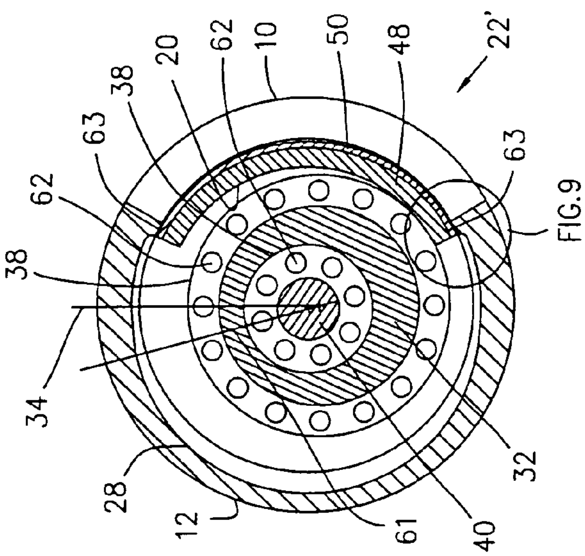
FIG. 8 is a cross sectional view of the valve similar to FIG. 7 with the valve shown in a closed but unsealed position.
Figure 9:
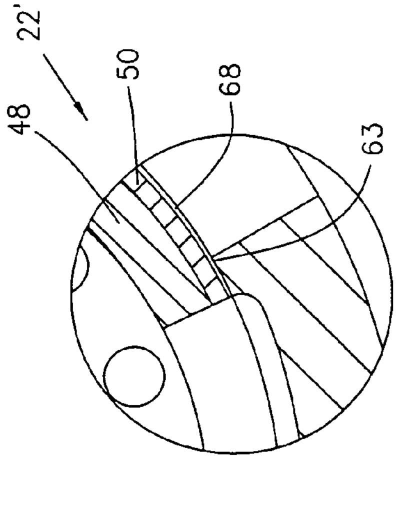
FIG. 9 is an enlarged view of the portion of FIG. 9 indicated by the circled labeled "FIG. 9".

FIG. 8 illustrates the relative position of the valve sleeve 20 and the rubberized layer 50 to the lip 63 when the lever 36 is employed to rotate the eccentric intermediate sleeve 32, thereby causing the valve sleeve 20 to move away from the lip 63 and thus disengaging the rubberized layer 50 from the lip 63. FIGS. 8 and 9 show the valve 10 in a closed position but unsealed condition, as indicated by numeral 22'. By employing the eccentric intermediate sleeve 32 to move the valve sleeve 20 away from the lip 63 of the housing 12, the layer 50 is disengaged from contact with the housing 12 prior to the valve sleeve 20 being rotated, thereby creating a gap 68 between the lip 63 and the layer 50, as illustrated in FIG. 9. The eccentric intermediate sleeve 32 is used prior to opening, closing, or rotating the valve sleeve 20. Without the eccentric intermediate sleeve 32, the layer 50 would be damaged when the valve 10 was opened, closed, or otherwise rotated.

Figure 4:
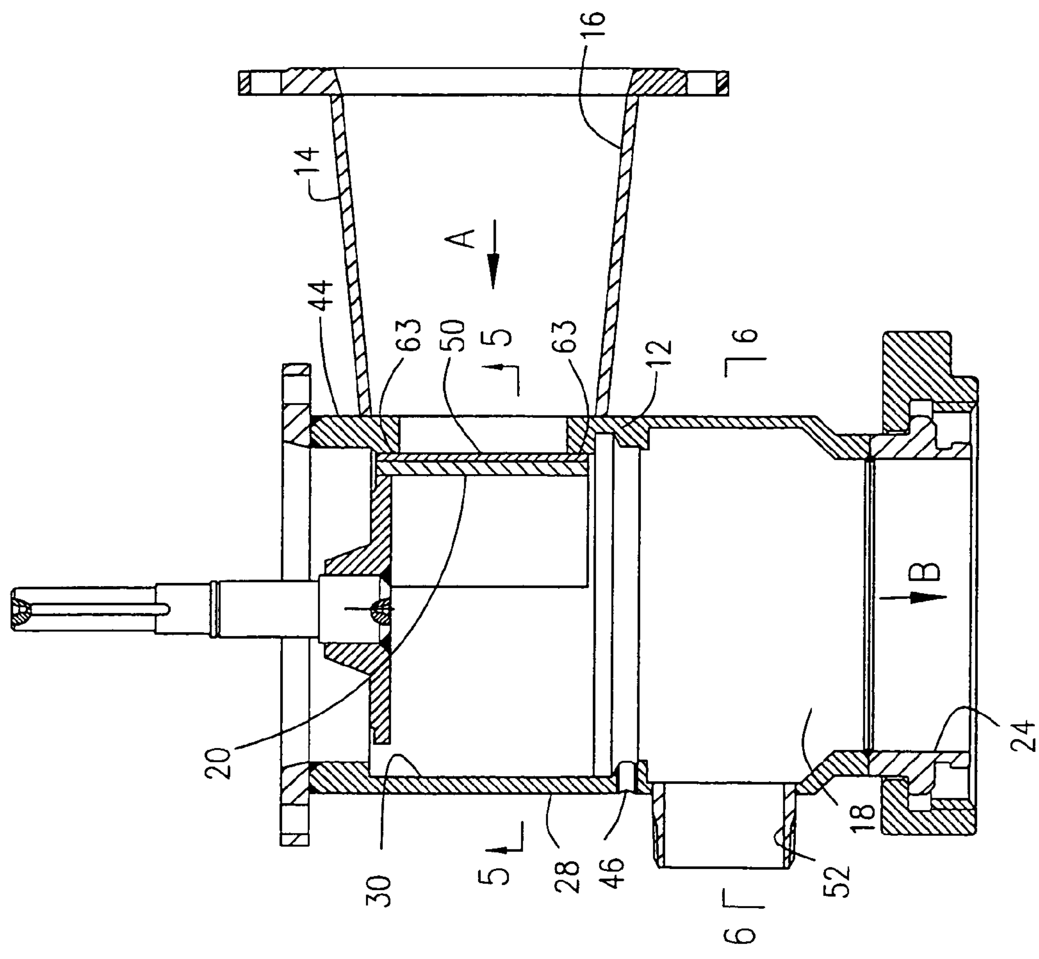
FIG. 4 is a cross sectional view of the housing and sleeve taken from the valve of FIG. 3.

In order to prevent dry powder material from blowing into the mouths 52 of vacuum breakers 54 that are provided on the valve 10, a sleeve shield 56 is provided within the present valve 10. The sleeve shield 56 shields the mouths 52 from the flow of dry powder material passing through the hollow interior 18 of the valve 10. The sleeve shield 56 is secured by means of bolts 58 and a sealing ring 60 to the interior surface 30 of the housing 12 immediately upstream of the mouths 52 of the vacuum breakers 54. As shown in FIG. 4, the housing is provided with bolt openings 46 for receiving the bolts 58. Sleeve shield 56 extends downstream of the mouths 52 of the vacuum breakers 54 to thereby prevent dry powdered material from being directly blown into the mouths 52 where the dry powder material could become wetted and cause blockage of the mouths 52.

Finally, the bushings 38 and 62 that are provided in association with the intermediate sleeve 32 and that rotatably suspend the sleeve shaft 40 and the attached valve sleeve 20 within the housing 12 utilize ball bearings, thereby making the intermediate sleeve 32 and the valve sleeve 20 easier to rotate.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A method for metering dry powder material using a metering valve comprising the following steps:

introducing powdered material into a hollow interior of an enlarged non-circular meter valve housing via an inlet provided on said housing, rotating a circular valve sleeve provided within said housing so that a lip provided within the housing surrounding the inlet as a sealing surface moves to create an opening between the sleeve and surrounding housing that allows the metered powdered material to begin flowing through said inlet to an outlet provided in said housing, and further rotating the valve sleeve so that an enlarged gap is formed between the enlarged non-circular housing and the circular valve sleeve everywhere within the housing except at the lip.

2. A method for metering dry powder material using a metering valve according to claim 1 wherein the valve sleeve can be opened by rotating the valve sleeve either to in a clockwise or counterclockwise direction.

3. A method for metering dry powder material using a metering valve comprising the following steps:

rotating a rotatable intermediate sleeve provided attached to said housing so that the intermediate sleeve rotates eccentric to the centerline of the hollow housing so that a valve sleeve which is attached to said rotatable intermediate sleeve alternately moves toward and away from the inlet in response to rotation of the intermediate sleeve, introducing powdered material into a hollow interior of a meter valve housing via an inlet provided on said housing, rotating the valve sleeve provided within said housing so that a lip provided within the housing surrounding the inlet as a sealing surface disengages the sleeve and thus allows the metered powdered material to begin flowing through said inlet to an outlet provided in said housing, and further rotating the valve sleeve so that an enlarged gap is formed between the enlarged non-circular housing and the circular valve sleeve every where within the housing except at the lip.

4. A method for metering dry powder material using a metering valve according to claim 3 wherein the valve sleeve can be opened by rotating the valve sleeve either clockwise or counterclockwise.

* * * * *